July 16, 1940.   C. A. WOODWARD   2,208,532

NUT MEMBER

Original Filed Oct. 15, 1938

Inventor
Clement A. Woodward
By Walter J. Jms
Attorney

Patented July 16, 1940

2,208,532

UNITED STATES PATENT OFFICE 2,208,532

NUT MEMBER

Clement A. Woodward, Roslindale, Mass., assignor to United-Carr Fastener Corporation, Cambridge, Mass., a corporation of Massachusetts Original application October 15, 1938, Serial No. 235,231. Divided and this application April 21, 1939, Serial No. 269,182

3 Claims. (Cl. 85—32)

This invention relates to a shockproof mounting installation for radio sets and more particularly to nut members used in connection with the same.

This application is a division of my application Serial No. 235,231, filed October 15, 1938, and containing claims to the shockproof mounting means.

Referring to the drawing, in which I have illustrated a preferred embodiment of my invention:

Figure 1:
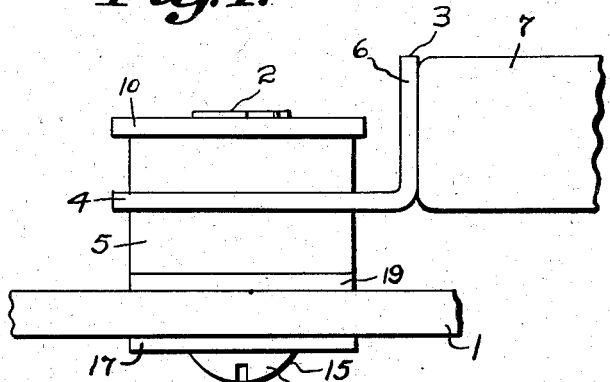
Fig. 1 is a side view showing the installation embodying my invention.
Figure 2:
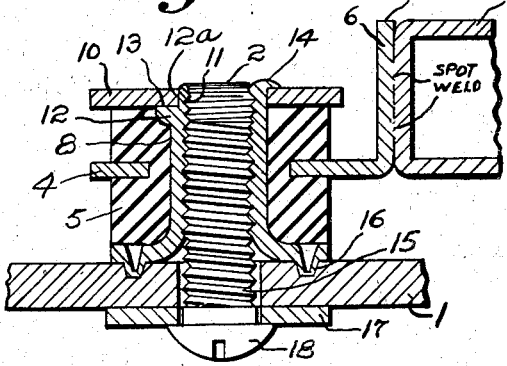
Fig. 2 is a sectional view of the installation shown in Fig. 1.

Referring to my preferred shockproof mounting installation illustrated in Figs. 1 and 2 of the drawing, I have shown a supporting member 1, which may be the wooden cabinet of a radio set, an attaching member such as the nut member 2 secured to the cabinet 1 and a bracket member 3 having one end 4 in embedded assembly with a grommet 5 of soft rubber or other resilient material. The other end 6 of the bracket is secured, as by spot-welding (Fig. 2), to a radio chassis 7. The grommet 5 encircles a shank 8 of the nut member 2 and is maintained in assembly with the nut member between a base 9 of the same and a laterally-projecting means such as a washer 10 in fixed assembly with the outermost end of the shank 8, as most clearly shown in Fig. 2. Thus the chassis 7 is secured to the cabinet 1 in such a way that jar or vibration transmitted to the cabinet 1 is absorbed by the rubber grommet 5.

Figure 3:
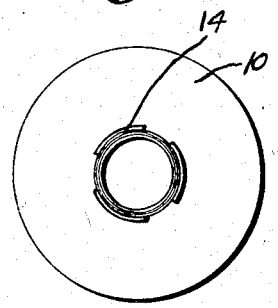
Fig. 3 is a top plan view of the nut assembly used in connection with the shockproof installation.
Figure 4:
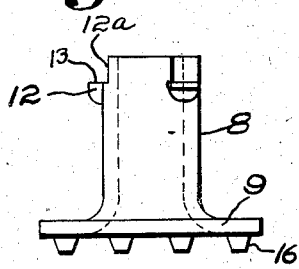
Fig. 4 is a side view of my improved nut member used in connection with the installation.
Figure 5:
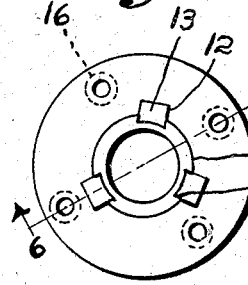
Fig. 5 is a top plan view of the nut member shown in Fig. 4.
Figure 6:
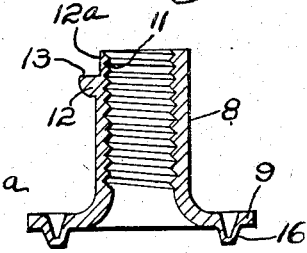
Fig. 6 is a section taken along the line 6—6 of Fig. 5.

Referring in detail to the nut member 2, the shank 8 of the nut member is internally threaded as at 11 and is drawn from the base 9 so as to extend in substantially right-angular relation thereto. In my preferred nut member I have formed ears 12 integral with the shank 8 and extending laterally from the shank in spaced relation to the base 9. The ears 12 may be formed through shearing into, but not all the way through, the wall of the shank from the outermost end thereof for a predetermined distance toward the base 9 and bending the material, thus cut away, into substantially perpendicular relation to the axis of the shank, as shown in Figs. 4 and 6. As a result of taking material from the shank 8 to form the ears, notches 12ª are provided in the outer surface of the shank extending from the outermost end of the shank to the points of junction of the ears with the shank. This leaves the threaded wall of the shank undisturbed. Each of the ears 12 provides a shoulder 13 facing the outermost end of the shank 10 and spaced from the same, as most clearly shown in Figs. 4 and 6. The ears 12 serve to effect attachment of the washer 10 to the nut member, which action is carried out through placing the washer over the shank 8 so that one surface of the washer rests upon the shoulders 13 of the ears and then clenching an annular portion 14 of the outermost end of the shank over an opposite surface of the washer (Figs. 2 and 3). With the washer 10 clenched tightly between portions 14 and ears 12 there is no possibility of the washer 10 vibrating in resonance with cabinet vibrations should the grommet 5 depress sufficiently to allow the washer 10 to float freely, as would be the case if the ears 12 were not present.

Assembly of the component parts of my installation is a relatively simple matter and is carried out through first forcing the rubber grommet 5, which has been assembled with the bracket 3, over the outermost end of the shank 8 of the nut member and moving the grommet into adjacent relation to the base 9 of the nut member. Next the washer 10 is securely affixed to the shank of the nut member through the method hereinabove described with the result that the grommet 5 is maintained in assembly with the nut member between the base 9 and the washer (Figs. 1 and 2). Finally the base 9 of the nut member is moved against the inner surface of the cabinet 1 and the parts are secured to the cabinet through means of the bolt 15 which is entered into threaded engagement with the shank 8 of the nut member from the outer surface of the cabinet. The base 9 of the nut member may have projections 16 extended downwardly therefrom and adapted to grip the inner surface of the cabinet during threaded engagement of the bolt and nut so as to prevent relative rotation of the parts. A washer 17 may be disposed between the head 18 of the bolt and the outer surface of the cabinet, as most clearly shown in Figs. 1 and 2.

Thus it will be seen that by my invention I have provided a shockproof mounting comprising parts of simple construction adapted to be quickly and easily assembled together to carry out in a satisfactory manner the desired objects.

Although I have illustrated and described a preferred embodiment of my invention, I do not wish to be limited thereby because the scope of my invention is best defined in the following claims.

I claim:

1. An improved nut member having a base portion and a shank portion extending from said base portion, said shank portion having a laterally-projecting ear intermediate said base portion and the outermost end of said shank.

2. An improved nut member having a base portion and a shank portion extending from said base portion, said shank portion having an integral laterally-projecting ear in spaced relation to the outermost end thereof and a notch extending from the outermost end to the point of junction of said ear with said shank.

3. A mounting member having a barrel portion, washer-supporting means spaced from one end thereof, washer-engaging riveting means adjacent to said washer-supporting means to lock a washer in place against said supporting means, said supporting means being in the form of ears shaved from said barrel portion.

CLEMENT A. WOODWARD.